United States Patent
Cavage et al.

(10) Patent No.: US 9,985,969 B1
(45) Date of Patent: *May 29, 2018

(54) CONTROLLING USE OF COMPUTING-RELATED RESOURCES BY MULTIPLE INDEPENDENT PARTIES

(71) Applicant: Amazon Technologies, Inc., Reno, NV (US)

(72) Inventors: Mark Joseph Cavage, Seattle, WA (US); John Cormie, Seattle, WA (US); Nathan R. Fitch, Seattle, WA (US); Don Johnson, Seattle, WA (US); Peter Sirota, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 602 days.

This patent is subject to a terminal disclaimer.

(21) Appl. No.: 13/853,926

(22) Filed: Mar. 29, 2013

Related U.S. Application Data

(63) Continuation of application No. 13/277,070, filed on Oct. 19, 2011, now Pat. No. 8,429,757, which is a
(Continued)

(51) Int. Cl.
    *H04L 29/06* (2006.01)
    *G06F 21/62* (2013.01)
    *G06F 21/60* (2013.01)

(52) U.S. Cl.
    CPC ............ *H04L 63/10* (2013.01); *G06F 21/604* (2013.01); *G06F 21/6218* (2013.01);
    (Continued)

(58) Field of Classification Search
    CPC ......... G06F 21/6218; G06F 2221/2141; G06F 21/604; H04L 63/20; H04L 63/102; H04L 63/10; H04L 63/0227
    (Continued)

(56) References Cited

U.S. PATENT DOCUMENTS 6,678,828 B1 * 1/2004 Pham ................... G06F 3/0622
                                                  726/2
7,296,235 B2   11/2007 Bhat et al. .................... 715/744
(Continued)

FOREIGN PATENT DOCUMENTS

WO       2007/052285       5/2007

OTHER PUBLICATIONS

Samarati, et al. ("Access Control: Policies, Models, and Mechanisms"; R. Focardi and R. Gorrieri (Eds.): FOSAD 2000, LNCS 2171, pp. 137-196, 2001. © Springer-Verlag Berlin Heidelberg 2001.*

(Continued)

Primary Examiner — Mahfuzur Rahman
Assistant Examiner — Narciso Victoria
(74) Attorney, Agent, or Firm — Seed IP Law Group LLP

(57) ABSTRACT

Techniques are described for managing access to computing-related resources that, for example, may enable multiple distinct parties to independently control access to the resources (e.g., such that a request to access a resource succeeds only if all of multiple associated parties approve that access). For example, an executing software application may, on behalf of an end user, make use of computing-related resources of one or more types that are provided by one or more remote third-party network services (e.g., data storage services provided by an online storage service)—in such a situation, both the developer user who created the software application and the end user may be allowed to independently specify access rights for one or more particular such computing-related resources (e.g., stored data files), such that neither the end user nor the software application developer user may later access those resources without the approval of the other party.

23 Claims, 9 Drawing Sheets

Related U.S. Application Data continuation of application No. 11/966,692, filed on Dec. 28, 2007, now Pat. No. 8,051,491.

(60) Provisional application No. 61/012,714, filed on Dec. 10, 2007.

(52) U.S. Cl.
CPC ........ *H04L 63/0227* (2013.01); *H04L 63/102* (2013.01); *H04L 63/20* (2013.01)

(58) Field of Classification Search
USPC ....................................................... 726/30, 1
See application file for complete search history.

(56) References Cited

U.S. PATENT DOCUMENTS

| | | | |
|---|---|---|---|
| 7,478,419 B2 | 1/2009 | Anderson et al. | 726/1 |
| 7,590,684 B2* | 9/2009 | Herrmann | 709/203 |
| 8,453,196 B2* | 5/2013 | Lerner et al. | 726/1 |
| 2002/0002613 A1* | 1/2002 | Freeman | G06F 9/5027 709/225 |
| 2006/0015935 A1* | 1/2006 | Dixon et al. | 726/11 |
| 2006/0191017 A1 | 8/2006 | Hieda | |
| 2007/0240194 A1* | 10/2007 | Hargrave | G06F 21/6209 726/1 |
| 2008/0066147 A1* | 3/2008 | Dillaway | G06F 21/6236 726/1 |
| 2008/0301760 A1* | 12/2008 | Lim | 726/1 |

OTHER PUBLICATIONS

Amazon DevPay—Limited Beta, retrieved on Dec. 20, 2007, from http://www.amazon.com/b/ref=sc_fe_c_1_3435361_1?ie=UTF8 &node=342429011&no=343536 . . . , 6 pages.

Discretionary Access Control, retrieved on Nov. 15, 2007, from http://en.wikipedia.org/wiki/Discretionary_access_control, 2 pages.

Mandatory Access Control, retrieved on Nov. 15, 2007, from http://en.wikipedia.org/wiki/Mandatory_access_control, 4 pages.

Role-Based Access Control, retrieved on Nov. 15, 2007, from http://en.wikipedia.org/wiki/Role-based_access_control, 3 pages.

SecPAL, retrieved on Oct. 11, 2007, from https://research.microsoft.com/projects/SecPAL, 2 pages.

Welcome to Amazon Web Services, retrieved on Dec. 20, 2007, from http://www.amazon.com/gp/browse.html?mode=3435361, 3 pages.

Becker, Moritz Y., "Design and Semantics of a Decentralized Authorization Language," CSF '07, $20^{th}$ IEEE, Jul. 6-8, 2007, 13 pages. (+1 page Abstract).

Dillaway, Blair, "A Unified Approach to Trust, Delegation, and Authorization in Large-Scale Grids," Microsoft Corporation Technical Paper, Sep. 2006, 24 pages.

$3^{rd}$ Party Submission of Prior Art Under 37 CFR1.501, Nov. 14, 212, 74 pages.

Lin, D., et al. "Policy Decomposition for Collaborative Access Control," SACMAT '08, Jun. 11-13, 2008, Estes Park, Colorado, 10 pages.

\* cited by examiner

CONTROLLING USE OF COMPUTING-RELATED RESOURCES BY MULTIPLE INDEPENDENT PARTIES

CROSS REFERENCE TO RELATED APPLICATIONS

This application is a continuation application of U.S. patent application Ser. No. 13/277,070, now U.S. Pat. No. 8,429,757, filed Oct. 19, 2011 and entitled "Controlling Use of Computing-Related Resources by Multiple Independent Parties." U.S. patent application Ser. No. 13/277,070 is a continuation application of U.S. patent application Ser. No. 11/966,692, filed Dec. 28, 2007 and entitled "Controlling Use of Computing-Related Resources by Multiple Independent Parties", now U.S. Pat. No. 8,051,491. U.S. patent application Ser. No. 11/966,692 claims the benefit of provisional U.S. Patent Application No. 61/012,714, filed Dec. 10, 2007 and entitled "Controlling Use Of Computing-Related Resources By Multiple Independent Parties," which is hereby incorporated by reference in its entirety.

TECHNICAL FIELD

The following disclosure relates generally to managing access to a computing-related resource.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While capabilities provided by services over networks to remote users and other clients have various benefits, various problems also exist. For example, as the numbers of clients and services increase, it can be difficult for the services to manage access to the computing-related resources in order to provide desired behavior, particularly when multiple parties are involved in a single access of a computing-related resource.

DETAILED DESCRIPTION

Figure 1:
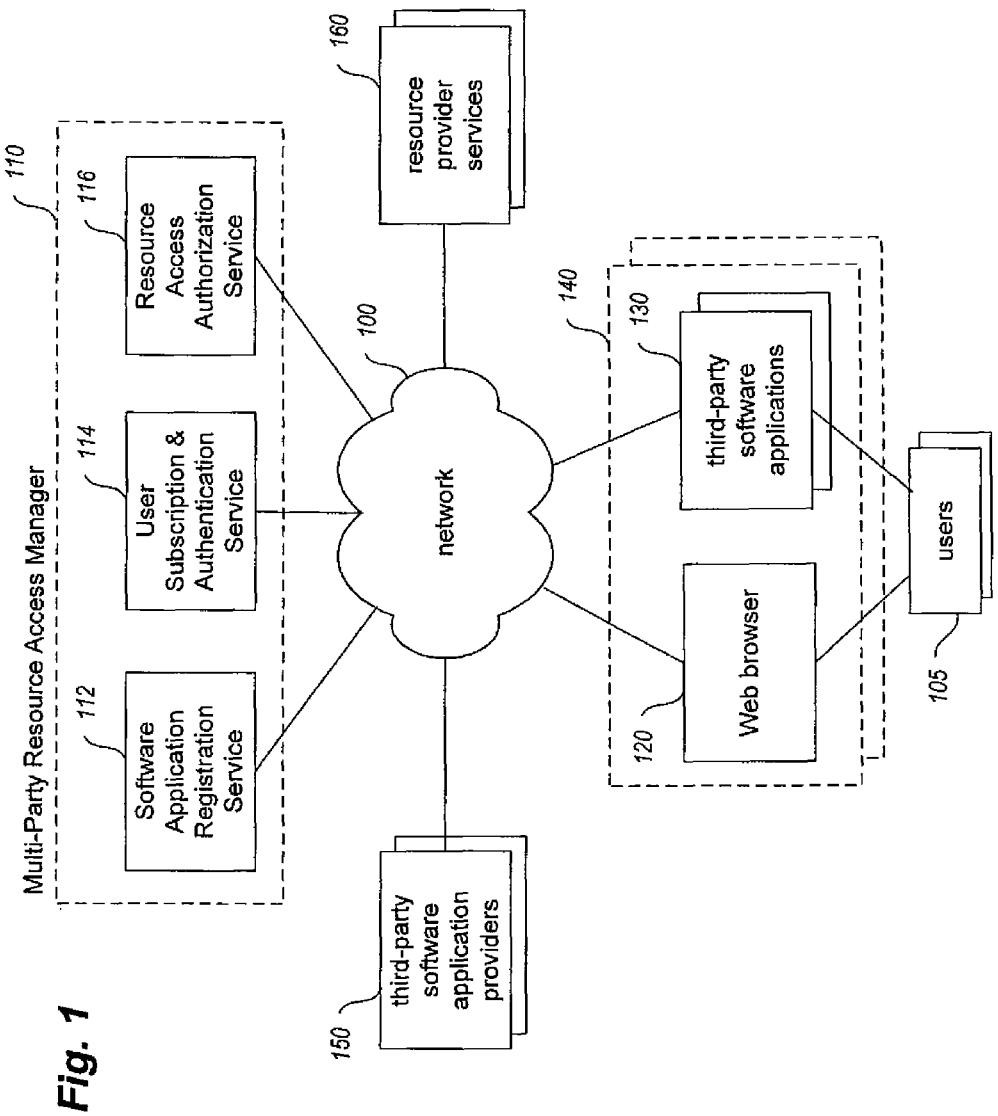
FIG. 1 is a network diagram illustrating an example of interactions to facilitate control of access to computing-related.

Techniques are described for, among other things, managing access to computing-related resources so as to enable multiple distinct parties to independently control access to the resources. In particular, in at least some embodiments, a computing-related resource may be associated with multiple distinct parties that each are allowed to independently control access to the computing-related resource, such that a request to access the resource succeeds (or alternatively, fails) only if all of the multiple associated parties agree to approve (or alternatively, to not approve) that access. As one illustrative example, an executing software application may, on behalf of an end user, make use of computing-related resources of one or more types that are provided by one or more remote third-party network services (e.g., data storage services provided by an online storage service)—in such a situation, both the developer user who created the software application and the end user may be allowed to independently specify access rights for one or more particular such computing-related resources (e.g., stored data files), such that neither the end user nor the software application developer user may later access those resources without the approval of the other party. Such access rights may be specified and used to control access to computing-related resources in a variety of manners in various embodiments, and the use of such access rights may provide a variety of benefits, as discussed in greater detail below. In addition, in at least some embodiments, at least some of the described techniques are automatically performed by one or more components of an embodiment of a Multi-Party Resource Access Manager ("MPRAM") system, as described in greater detail below.

Access rights related to computing-related resources may be specified and used in various manners in various embodiments. In particular, in at least some embodiments, the multiple distinct parties who independently control access to a computing-related resource may each specify one or more access policies that include constraints or other information related to circumstances under which access to the resource is be allowed and/or denied. If so, access to the computing-related resource may then be automatically managed by determining whether the combination of multiple access policies from the multiple distinct parties approve that access, such as by a request for access independently satisfying each of the multiple access policies. For example, the multiple access policies corresponding to a computing-related resource may be specified before access to the resource is first initiated and/or as part of initiating a first access of the resource (e.g., as part of creating a stored data file), and subsequent requests for access to the resource may be granted based at least in part on the request satisfying all of the access policies (so as to deny access to the computing-related resource in this example if any one of the multiple access policies is not satisfied).

As previously noted, in at least some embodiments, the described techniques may be used to control access to one or more computing-related resources by one or more software applications operating on behalf of an end user, such that requested access to the one or more computing-related resources by the one or more remote software applications may be authorized if the access policies specified for the software applications (e.g., by the creator(s) or other provider(s) of the software applications) and for the end user all agree to permit the requested access. For example, a software application developer user (or other party) may specify a first access policy to control subsequent access to remote computing-related resources by any executing copy of a software application, and each end user of a copy of that software application (or other party) may specify a distinct second access policy to control subsequent access to remote computing-related resources on behalf of the user. Furthermore, in some embodiments, one or more other distinct parties may further be enabled to specify access policies for some or all of the same remote computing-related resources, such that access to those remote computing-related resources by a copy of the software application on behalf of one of the end users may be granted if the access at least satisfies a combination of the software application's access policy, the user's access policy, and the one or more other access policies from the other distinct parties. For example, in some embodiments, the one or more other distinct parties may include one or more other software applications (e.g., if a first software application accesses functionality of a distinct second software application on behalf of an end user of the first software application, and the second software application uses one or more computing-related resources of a remote resource provider service as part of providing functionality to the first software application, both the first and second software applications may independently be able to control access to those resources), a service that provides those computing-related resources, one or more other users, etc. More generally, the various distinct parties that may be allowed to independently control access to resources in various embodiments and situations may include, for example, creators of software applications (e.g., individual software program developers, corporate software program developers, etc.) or other providers of such software applications (e.g., distributors of the software applications), end users of the software applications, resource provider services, other various parties (e.g., other end users of other executing copies of the same software application, other end users of other software applications, other software application creators, etc.), and/or other acting on behalf of one or more such parties.

In at least some embodiments, various Web services or other network services may each provide one or more types of computing-related resources to remote software applications operating on behalf of users over one or more networks. Such network services may generally be referred to as "resource provider services" herein in at least some embodiments, such as to reflect that such a service may provide an application with access to use one or more computing-related resources and/or with access to results from or other benefits from using one or more computing-related resources on the application's behalf.

The described techniques may control access to various types of computing-related resources provided by resource provider services in various embodiments. A non-exclusive list of examples of types of computing-related resources that may be provided by resource provider services include the following: persistent data storage capabilities (e.g., on non-volatile memory devices, such as hard disk drives); temporary data storage capabilities (e.g., on volatile memory, such as RAM); program execution capabilities (e.g., for a software program provided by an user, such as a user-specific virtual machine image to be executed on one of multiple virtual machines supported by one or more physical computing systems; for a software program made available by an application to an user for use by the user; for a software program used by an application on behalf of an user, such as to manipulate the user's data; etc.); message queuing and/or passing capabilities; other types of communication capabilities (e.g., network sockets, virtual communication circuits, etc.); database management capabilities; dedicated bandwidth or other network-related resources; input device capabilities; output device capabilities; etc. In addition, in some embodiments, the described techniques may be used to control access to various portions of the various types of computing-related resources, such as, for example, with respect to a persistent data storage resource, access may be controlled to particular stored data, particular portions of a hard disk drive of a computing system, etc.

In some embodiments, access policies may contain one or more rules, statements, criteria or other information to constrain or otherwise control access to one or more indicated computing-related resources, such that specifying an access policy includes indicating one or more computing-related resources (e.g., by indicating a particular resource provider service that provides those resources) and specifying information related to accessing the one or more computing-related resources. Such statements may include, for example, one or more of the following for use in allowing and/or denying access: specified criteria for or other identification of an identity and/or type of the requester; specified criteria for or other identification of a source of a request (e.g., a network location); specified current conditions at a time of the request that are required and/or prohibited; specified criteria regarding the type of a request (e.g., read, write, execute, delete, etc.); specified criteria regarding the type of one or more computing-related resources that are the target of the request; one or more specific target computing-related resources for the request; the inclusion of particular information with the request (e.g., bearer information, certificates, etc.), etc. In various embodiments, an access policy may include statements to control access to one or more specific computing-related resources provided by a particular resource provider service, and/or statements to control access to any computing-related resources from a particular resource provider service as a whole. In addition, access policies may be represented in various manners in various embodiments, such as an XML document, a list of one or more rules or other constraints, etc. In some embodiments, access policies may also contain information that indicates delegation or sharing of access rights to a computing-related resource between parties, such as from a party having such rights to another party who did not have such rights prior to the sharing. For example, a policy statement may indicate that a first party having certain access rights to a computing-related resource (e.g., read, write, delete, etc. rights to stored data files) has delegated at least some such rights to a distinct second party, so that the distinct second party may access the computing-related resource in the delegated manner.

FIG. 1 is a network diagram that illustrates various parties and services interacting over one or more networks, with an illustrated embodiment of a Multi-Party Resource Access Manager system provided to facilitate control of access to computing-related resources. In particular, the illustrated example includes a number of example users 105 that each are using one or more example software applications 130, which when executing use computing-related resources from resource provider services 160 over a network 100 on behalf of the end users. The software applications may, for example, be provided by software application providers 150, such as to optionally execute locally on computing systems 140 of the end users, although in other embodiments software application providers may instead execute network software applications on separate computing systems that are accessed remotely by end users over the network 100. The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged parties. In still other embodiments, the network 100 may include one or more private networks with access to and/or from other private and/or public networks.

In order to control the access to the computing-related resources in accordance with instructions from multiple parties, which in this example include the end users 105 and providers of the software applications 130, the end users, software application providers, software applications and resource provider services interact with an example Multi-Party Resource Access Manager system 110 over a network 100. For example, in some embodiments, the system 110 may include one or more components, and the system 110 and/or the components may provide one or more APIs via which the software applications and/or resource provider services may send in requests to access one or more computing-related resources, which the system 110 determines whether to authorize based at least in part on previously specified access policies for the relevant parties and/or other indicated access-related information. As one specific example, one or more of the software applications 130 may be designed to use a third-party resource provider service that provides persistent data storage functionality, such as by interacting over the network 100 with that appropriate resource provider service via APIs provided by that service to store data on behalf of one or more end users.

In FIG. 1, the one or more optional user computing systems 140 may each further contain a Web browser 120 or other software application that the end user may use to interact with software application providers 150 (e.g., to obtain information about available software applications, to download local copies of software applications, etc.) and/or the system 110 (e.g., to subscribe to use a particular software application, to specify access policies for the end user, etc.). In other embodiments in which one or more of the software applications are executing on remote computing systems, the users may similarly use the Web browser 120 or other software application to interact with those remote software applications over the network.

The illustrated embodiment of the Multi-Party Resource Access Manager system 110 may perform at least some of the described techniques in order to manage access to computing-related resources by one or more software applications executing on behalf of a user, such that the access may be managed based at least in part on multiple access policies specified by multiple distinct parties. In the illustrated example, multiple distinct parties may specify one or more access policies related to controlling access to one or more computing-related resources provided by one or more of the resource provider services 160, such as by each distinct party interacting with the system 110 to specify one or more access policies. For example, in some embodiments, one or more software application developers (e.g., such as one or more of the software application providers 150) may each interact with the system 110 to specify one or more access policies to control access to one or more computing-related resources used by a software application 130 being created. At least some such access policies may be stored by the system 110 for later use, with each software application having a unique identifier that is associated with those access policies for later retrieval when access requests are made, although in other embodiments at least some such access policies may instead be included with the software applications and passed along with the access requests. Similarly, prior to using the one or more software applications 130, one or more of the users 105 may each interact with the system 110 to specify one or more access policies to control access to one or more computing-related resources used on behalf of the user, such as when subscribing to use the software application. At least some such access policies may be stored by the system 110 for later use, with each user having a unique identifier (e.g., a unique identifier for each software application used by the user) that is associated with those access policies for later retrieval when access requests are made, although in other embodiments at least some such access policies may instead be included with a token or other information provided to the software applications so that those access policies are passed along with the access requests.

After the access policies are specified for the one or more software applications and the one or more users, the use of computing-related resources may be controlled by interactions with the system 110 to determine whether such use is in accordance with the specified access policies. For example, an access request from a particular software application operating on behalf of a particular user to use or otherwise access a particular computing-related resource may be determined to satisfy multiple access policies specified by multiple parties (e.g., a software developer for that software application, and that user) for that particular computing-related resource, such as if the multiple access policies indicate that the requested use is allowed by the particular application and the particular user. If so, the access to the computing-related resource is then provided.

As previously noted, access policies may be specified at various times and in various ways. For example, prior to providing a software application for use by one or more users, a software application provider may interact with the system 110 to specify one or more access policies to control later access to computing-related resources used by the software application on behalf of the one or more users. For example, a software developer may design one or more software applications to provide functionality that uses one or more computing-related resources provided by one or more of the remote resource provider services 160, and may interact with the system 110 to specify access policies to control future access to computing-related resources from those resource provider services. In addition, one or more users 105 may interact with the system 110 to specify access policies to control access to computing-related resources, such as in accordance with particular software applications and/or resource provider services. For example, a user may interact with the system 110 to specify access policies by, for example, interacting with an interactive Web site interface provided by the system 110 (e.g., via a Web browser 120). As one illustrative example, a user may interact with an embodiment of the system 110 to specify an access policy that allows an indicated first software application to obtain access to computing-related resources used by an indicated second software application on behalf of the user (e.g., to obtain access privileges such as for read, write, delete, execute, modify, etc.), and/or to specify an access policy that allows an indicated other user to obtain access to computing-related resources used by the second software application (or any software application) on behalf of the user. As a further illustrative example, the user may instead specify an access policy related to use of one or more computing-related resources on the user's behalf by a software application while interacting with that software application, with the software application providing information about the specified access policy to the system 110 (e.g., as part of a request to initiate use of or other access of those computing-related resources, by using an API provided by the system 110 to specify access policies, etc.).

As previously noted, in various embodiments, specified access policies may be obtained by the system 110 in various ways when evaluating whether requested access for a computing-related resource may be granted. For example, one or more baseline access policies may be specified by multiple distinct parties in advance and stored by the system 110 (e.g., in a database), such as for later retrieval and use in determining whether a subsequent request for access to a computing-related resource is in accordance with the stored access policies. In addition, one or more access policies may be provided to the system 110 with a request for access to a computing-related resource (e.g., via one or more query parameters in an HTTP request to a resource provider service), such that the provided access policies may be used as part of determining if the request is to be granted or otherwise authorized. Such access policies that are included with an access request may be generally referred to as "bearer policies" in at least some situations to reflect that such policies apply to a bearer of a policy (e.g., the party who provides the access policy to the system 110 at the time of the request), such as if the access policy is provided to the bearer (whether to a specific party and/or to any bearer of the access policy) to delegate at least some access rights from another party to whom the delegated access rights belong. Furthermore, such access policies that are included with an access request may be generally referred to as supplemental access policies in at least some situations to reflect that such policies provide additional access information relative to a stored baseline access policy, such as if a stored baseline access policy denies access to anyone but a creator of the access policy unless a supplemental access policy from that access policy creator is received that indicates that access to another party is granted. Thus, in at least some embodiments, the multiple access policies specified to control access to a computing-related resource include one or more baseline access policies stored by the system 110 for later use and include one or more supplemental and/or bearer access policies provided with an access request.

In this example embodiment, the example Multi-Party Resource Access Manager system 110 includes a federation or other combination of multiple services that each provides a portion of the functionality related to controlling access to computing-related resources, including a Software Application Registration Service 112, a User Subscription And Authentication Service 114, and a Resource Access Authorization Service 116. For example, the Software Application Registration Service 112 may provide functionality that includes allowing various parties to specify access policies to control subsequent access to computing-related resources by one or more software applications, such as for parties that include creators or other providers of those software applications. The User Subscription And Authentication Service 114 may provide functionality that includes allowing various parties to subscribe to use one or more third-party software applications and specify access policies to control subsequent access to computing-related resources on behalf of particular users, such as for parties that include those users. The Resource Access Authorization Service 116 may provide functionality that includes determining whether requested access to one or more computing-related resources is authorized based at least in part on satisfying multiple access policies specified by multiple distinct parties (e.g., such as access policies specified using the Software Application Registration Service and the User Subscription and Authentication Service). In some embodiments, the multiple services 112, 114 and 116 may be combined as a single service provided by the system 110 (e.g., if each of the services 112, 114 and 116 is provided by a distinct component of the system 110), while in other embodiments the services 112, 114 and 116 may instead operate independently (e.g., such as by executing on different computing systems and/or by being provided by distinct entities). Furthermore, the services 112, 114 and 116 may in some embodiments share various information (e.g., access policies) directly between the services, such as by storing such information in a manner accessible by all of the services, while in other embodiments may operate in a distributed manner such that some or all such information is instead provided to the system 110 (e.g., to the service 116) by software applications as part of provided access requests (e.g., by those access requests including information provided to the software applications by the services 112 and/or 114).

As previously described, the Software Application Registration Service 112 may provide functionality to allow software developers to register software applications developed by the software developers. As part of such registration, a software developer of a software application may, for example, interact with the illustrated Software Application Registration Service 112 to specify one or more access policies associated with the software application, such as by providing information associated with one or more constraints to control access to one or more computing-related resources used by the software application. In some embodiments, the specified access policies may be stored (e.g., in a database) by the Software Application Registration Service for later use in managing access to the computing-related resources, such that the stored access policies may be obtained at a later time to determine if requested access to a computing-related resource is in accordance with the one or more stored access policies. For example, the stored one or more access policies may be obtained by an embodiment of the Resource Access Authorization Service 116 at such later times (e.g., by directly retrieving the stored access policies, interacting with the Software Application Registration Service via a provided API, etc.). Alternatively, in some embodiments, some or all of the specified one or more access policies may be returned to the software developer, such that the returned one or more access policies may be later provided with access requests to the Resource Access Authorization Service 116.

In some embodiments, as part of a software developer registering a software application, the Software Application Registration Service may generate a distinct product token for the software application and return the product token to the software developer. Such a product token may subsequently be used to identify the associated software application and/or to obtain information related to one or more specified access policies associated with the software application. In particular, in some embodiments, each copy of the software application may include the product token (e.g., such as by compiling the data contained in the product token into the executable machine code of the software application), such that the product token may be provided by and/or used by executing copies of the software application to identify the software application. Product tokens may contain various information that may include, for example, one or more identifiers (e.g., to identify the registered software application and/or other parties or applications, etc.), information related to specified access policies (e.g., access policy statements, references to stored access policy statements, etc.), information related to management of the product token (e.g., dates related to a creation and/or expiration time, etc.), etc. An executing software application copy may then include its product token when interacting with the system 110, and may be used by the system 110 to obtain information related to one or more specified access policies associated with the software application. For example, such specified access policy information may be obtained by mapping one or more identifiers contained in the product token to one or more stored access policies that have been previously associated with the identifiers (e.g., such as in a database, etc.), by requesting one or more specified access policies from one or more referenced locations indicated by the product token (e.g., network addresses or other network locations indicated by URLs or other URIs, pathnames, database keys, etc.), and/or by being explicitly contained within the product token (e.g., via one or more policy statements embedded in the product token). In some embodiments, the Software Application Registration Service may also provide other functionality, such as to screen a software application to determine whether the software application meets specified minimum requirements (whether performed automatically and/or by one or more human screeners).

As previously described, the User Subscription And Authentication Service 114 may provide functionality that allows one or more users to subscribe to use software applications. In particular, a potential user may interact with an embodiment of the service 114 to subscribe to use one or more software applications that have been previously registered by software developers and made available for use by one or more users. A user may interact with the User Subscription And Authentication Service 114 by, for example, interacting with a user interface provided by the service 114 (e.g., a user interface based on one or more Web pages), and/or by interacting with another service and/or application that interacts the service 114 via a provided API. Such user interactions may include providing various information related to a subscription request (e.g., user identification, group affiliation, billing information, payment, etc.), and/or the user receiving various information related to success/failure of the subscription request (e.g., upon success, the user may receive an activation key to activate an application, may receive a link to download an application, etc.). The service 114 may also provide functionality to allow users to specify one or more access policies to control access to computing-related resources by the subscribed-to software application on behalf of the users. In some embodiments, the service 114 may store specified access policies for later retrieval and use in controlling subsequent requested access to computing-related resources, while in other embodiments the service 114 may provide specified access policies to the user and/or to the subscribed-to software application (e.g., for use as a bearer policy). In some embodiments, a user may further specify one or more access policies at one or more other times (e.g., during software application installation, initialization, or execution). In addition, in some situations, a party other than the subscribed user may provide information related to the specification of the one or more access policies to control access to computing-related resources on behalf of the subscribed user, such as another party acting on behalf of the subscribed user.

In some embodiments, as part of a user subscribing to use one or more software applications, the User Subscription And Authentication Service 114 may generate one or more user tokens that may each be used to identify the subscribed user, and further in some embodiments to authenticate the subscribed user and/or to provide information related to one or more access policies associated with the subscribed user. As part of generating a user token, the service 114 may embed various types of information into the token. For example, a user token may contain various information including, for example, one or more identifiers (e.g., to identify the subscribed user and/or other parties, etc.), information related to specified access policies (e.g., access policy statements, references to stored access policy statements, etc.), information related to the management of the user token (e.g., dates related to creation/expiration, indications of whether the token may be renewed, etc.), and other information (e.g., user account information; user authentication information; associated product information, such as information related to an associated software application; etc.). User tokens may then be used to obtain information related to one or more access policies associated with one or more subscribed user by using techniques similar to those previously described with respect to product tokens (e.g., using identifiers, references, access policy statements, etc., contained within the user token). Furthermore, in some embodiments, a user token may be associated with a particular software application, such that the user token is constrained to be used in conjunction with only that particular associated software application. In such cases, a distinct user token may be generated for each software application to which a user subscribes, and may be used for the purposes of controlling access to computing-related resources used by that associated software application on behalf of the user.

In some embodiments, the User Subscription And Authentication Service 114 may also provide functionality to authenticate subscribed users. For example, in some embodiments, the User Subscription and Authentication Service may verify that a user is subscribed to use a particular software application, such as based on a request from the software application (e.g., a request that includes an activation key provided to the user and then supplied by the user to the software application). In addition, the service 114 may provide features to verify that various types of information (e.g. information associated with requests for computing-related resources, access policies, user tokens, etc.) have been provided by a subscribed user. For example, the service 114 may provide one or more encryption keys associated with a user, so that information provided by a subscribed user may be signed using the one or more encryption keys and subsequently verified. Various known encryption or other identification techniques may be used, including symmetric keys, keyed-Hash Message Authentication Code ("HMAC"), X-509 certificates, etc.

As previously noted, in at least some embodiments, the service 114 may provide a subscribing user with an activation key that may be used to activate an associated subscribed-to software application. An activation key may, for example, be an alphanumeric key that contains information associated with a subscribed user, an associated software application to which the user has subscribed, key management information (e.g., expiration date, etc.), etc. In such cases, after a user subscribes to use a software application and receives a corresponding activation key, the user may provide the activation key to an executing copy of the software application, such as during installation and/or initialization of the software application (e.g., the software application may prompt the user to provide the key). Upon receiving the activation key from a user, the software application copy may interact with an embodiment of the service 114 to verify that the user is subscribed to use the application, and/or in some situations to specify one or more access policies on behalf of the user. For example, an application may automatically provide the activation key and its product token to the service 114, and receive back a generated user token to be used in later requests for access to computing-related resources. As part of generating the user token, the service 114 may embed specified access policy information into the user token, and/or may store such information for later retrieval and use. After the user token is returned, the software application may store the user token for later use in subsequent access requests. In some embodiments, the service 114 may also return an encryption key that may be used to digitally sign subsequent requests for access to computing-related resources (e.g., using various known techniques including symmetric keys, HMAC, X-509, etc.), such as to verify authenticity of subsequent requests.

Additional details related to configuration of software applications and subscription by users are included in U.S. patent application Ser. No. 11/618,469, filed Dec. 29, 2006 and entitled "Providing Configurable Pricing For Use Of Invocable Services By Applications;" in U.S. patent application Ser. No. 11/618,480, filed Dec. 29, 2006 and entitled "Using Configured Application Pricing To Determine End User Fees For Use Of Invocable Services;" and in U.S. patent application Ser. No. 11/618,486, filed Dec. 29, 2006 and entitled "Providing Configurable Use By Applications Of Sequences Of Invocable Services;" each of which is hereby incorporated by reference in its entirety.

As previously described, the Resource Access Authorization Service 116 may provide functionality to determine whether a request for access to a computing-related resource should be granted or denied based at least in part on multiple access policies specified by multiple distinct parties who independently control access rights to the computing-related resource. Prior to determining whether a particular request for a computing-related resource should be allowed, the service 116 obtains the multiple specified access policies associated with the computing-related resource in one or more ways. For example, the service 116 may retrieve from storage one or more of the multiple specified access policies that have been stored prior to the request (e.g., from a database, etc.), such as by using information passed in with the access request to retrieve the one or more access policies (e.g., identification information such as an identifier associated with a mapped access policy, a database key, a URI, etc.). In addition, the service 116 may obtain one or more of the multiple specified access policies from the access request, such as one or more bearer policies. After the multiple specified access policies have been obtained, the service 116 evaluates the policy information contained in each access policy (e.g., the rules, statements, criteria, constraints, and other information) to determine if the current request satisfies each policy. For example, such determination may include consideration of one or more of the following, depending on the particular policy information contained in each access policy: the identity of the requester; the source of the request; current required and/or prohibited conditions at the time of the request; the type of the request; the type of computing-related resources that are the target of the request; the specific target of the computing-related resources for the request; the inclusion of particular information with the request; etc. If the request for access to the computing-related resource is determined to satisfy the multiple access policies, then the requested access may be allowed, and otherwise may be denied. Thus, using the described techniques, access to a computing-related resource may be managed based at least in part on multiple access policies specified by multiple distinct parties who independently control access rights for the computing-related resource.

In some embodiments, the service 116 may provide an indication of success and/or failure to a requester, such as a software application making an access request, or a resource provider service that provides the resource(s) whose access is requested. In such cases, after the requester receives an indication of success or failure, it may then handle the request for access accordingly. Alternatively, in some embodiments, the service 116 may indicate success by fulfilling the request for access, such as by making a request to a resource provider service on behalf of a software application (e.g., by brokering the request) and/or by directly accessing the requested computing-related resource on behalf of the software application.

Thus, in some embodiments, requests for access to computing-related resources may be provided to the service 116 from one or more software applications operating on behalf of users, such as software applications that have been registered using an embodiment of the Software Application Registration Service (as described above) and subscribed to by users interacting with an embodiment of the User Subscription And Authentication Service (as described above). In such embodiments, each of the requests may include a product token associated with the software application, a user token associated with the user upon whose behalf the software application is making the request, and possible other information (e.g., bearer policies obtained from other parties, security certificates, etc.). For each request, the Resource Access Authorization Service uses the provided product and user tokens to obtain access policies specified for the application and user, respectively (e.g., such as stored access policies, bearer policies, etc.). The obtained access policies may be combined with any other access policies that may have been provided with the request (e.g., additional bearer policies specified by one or more other parties, etc.), such that policy information contained in the multiple access policies may be evaluated to determine if the request for access to the computing-related resource should be allowed.

In at least some embodiments, the product token may contain information associated with a stored access policy, and the user token may contain information associated with a bearer policy, such that access for a resource may be granted if the stored access policy and the bearer access policy are satisfied. Example interactions related to using product tokens, user tokens, and other information provided with a request for access to computing-related resources by software applications on behalf of users are described in more detail with respect to FIGS. 2A-D. Furthermore, in some embodiments, a request received from a software application (including information provided with the requests, such as a product token, a user token, a certificate, etc.) may be signed by the requesting application, such as with an encryption key provided by an embodiment of the User Subscription and Authentication Service, as described above. Upon receipt of the request, the Resource Access Authorization Service may verify the authenticity of the request by the signature, such as, for example, by interacting with an embodiment of the User Subscription and Authentication Service to decrypt the information.

For illustrative purposes, some embodiments are described below in which specific types of users, software applications, computing-related resources, resource provider services, access policies, and interactions are used in specific manners. These examples are provided for illustrative purposes and are simplified for the sake of brevity, and it will be appreciated that the inventive techniques may be used in a wide variety of other situations, only some of which are described below.

FIGS. 2A-2D illustrate examples of using access policies of end users and software applications to control access to computing-related resources provided by third-party resource provider services. In particular, with respect to FIG. 2A, an indicated user 1 205 has previously subscribed to use a software application A 220 provided by a software application developer (not shown). During interactions with an executing copy of the software application A (e.g., a copy executing locally on a computing system, not shown, of user 1), user 1 supplies 270 a user token 212 to the software application A to represent the end user. As discussed in greater detail elsewhere, in some embodiments the actual user token (referred to in this example as user token 1-A) is provided to software application A by an authentication component (not shown) of a Multi-Party Resource Access Manager system, such as after user 1 supplies an activation key to the software application A.

After receiving the user token 212, the software application A initiates a request 272 to obtain access to an indicated resource Z 260 provided by a resource provider service (not shown), such as may be prompted by instructions or other interactions by user 1 with software application A. Computing-related resource Z may have various forms in various situations and embodiments, and in this example reflects a stored file that was previously created by software application A on behalf of user 1, such as via interactions with a resource provider service that provides network storage services for a fee (e.g., with user 1 and/or software application A having a specified amount of storage in which one or more such files or other data may be stored and accessed over a network). In the illustrated example, the request 272 includes an identifier 216 specific to resource Z, as well as user and product tokens 212 and 214 corresponding to user 1 and software application A. As discussed in greater detail elsewhere, in at least some embodiments, one or both of the tokens 212 and 214 may include unique identifiers for user 1 and software application A, respectively, and/or access policies specified by or for user 1 and software application 1, respectively. The request 272 may further include various other information that is not shown, and may be encoded in various manners.

In this example, the request 272 is made by software application A to a Resource Access Authorization service 240 to determine whether to authorize the access based at least in part on the access policies specified for user 1 and software application A, such as in a manner similar to that previously discussed with respect to Resource Access Authorization service 116 of FIG. 1. In other embodiments, the request may instead be made directly to a resource provider service that provides resource Z, and that resource provider service may make the request to the Resource Access Authorization service 240 to determine whether the access is authorized. In the illustrated embodiment, the Resource Access Authorization service 240 identifies user 1 from the token 212, retrieves any stored baseline access policies (not shown) for that user that correspond to resource Z, and retrieves any supplemental access policies included with the request that were specified by or for user 1. Similarly, the Resource Access Authorization service 240 identifies software application A from the token 214, retrieves any stored baseline access policies (not shown) for the software application that correspond to resource Z, and retrieves any supplemental access policies included with the request for software application A. In this example, there are no such supplemental access policies for user 1 or software application A included with the request. In addition, in some embodiments, user 1 and/or software application A may each have at most a single access policy for use with all resources, while in other embodiments one or both may have multiple access policies specific to different resources (e.g., different access policies specific to different resource provider services and/or to specific resources).

After retrieving the baseline and supplemental access policies for user 1 and software application A, the service 240 determines whether access to resource Z is authorized, such as if a combination of all of the access policies are satisfied by the request for access. After the service 240 determines that access is authorized, the service 240 provides an indication of that access authorization, which in this example includes a communication 274 for the service 240 to obtain use of the resource Z on behalf of the software application A and user 1. In other embodiments, the indication of access authorization may instead be provided to the executing copy of the software application A and/or to the resource provider service that provides resource Z.

Figure 2A:
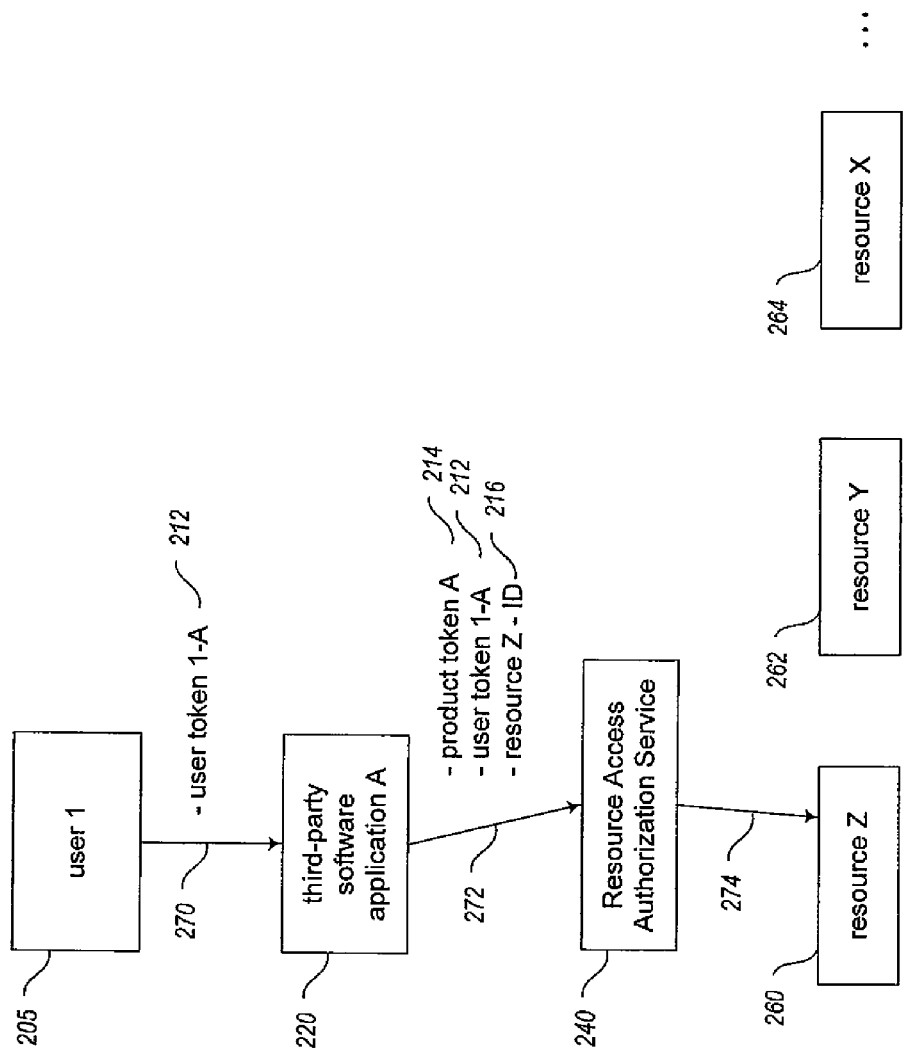
FIGS. 2A-2D illustrate examples of interactions that facilitate controlling access to computing-related resources based on instructions from multiple distinct parties.
Figure 2B:
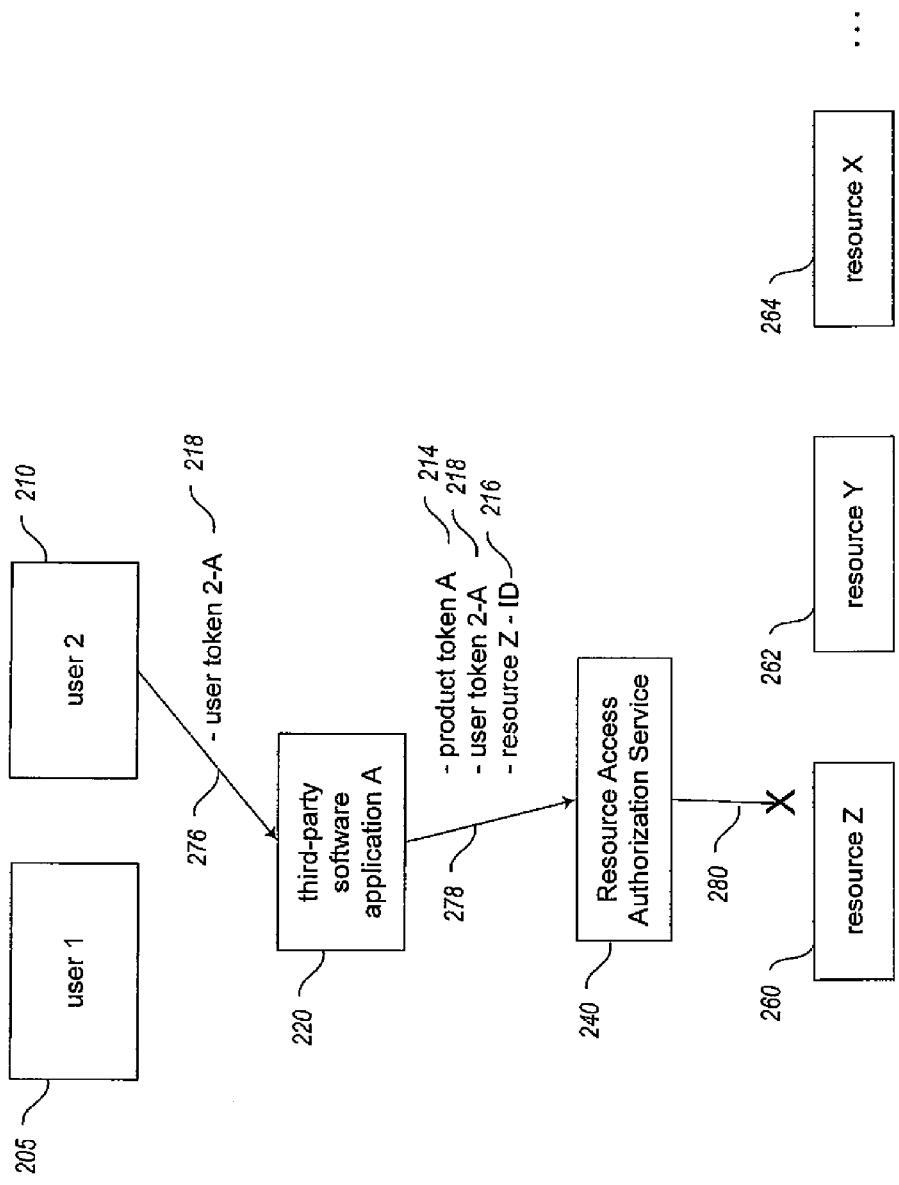

FIG. 2B continues the example of FIG. 2A, but in this example another user is attempting to access the same resource Z 260 whose use was previously initiated by software application A on behalf of user 1. In particular, user 2 210 similarly initiates one or more interactions 276 via which a user token 218 for user 2 and software application A is supplied to an executing copy of software application A 220 (e.g., an executing copy that is distinct from the executing software application copy used by user 1, such as a copy executing locally on a computing system, not shown, of user 2). In other embodiments, the software application A may instead be a network software application, such that both user 1 and user 2 may interact with a single remote copy of the software application.

In this example of FIG. 2B, the software application A initiates a request 278 to the Resource Access Authorization service 240 for access to resource Z 260 on behalf of user 2. The request 278 includes an indication 216 of the resource, as well as tokens 218 and 214 corresponding to user 2 and software application A, respectively. The service 240 operates in a manner similar to that previously described with respect to FIG. 2A, including identifying user 2 and software application A from their corresponding tokens, retrieving any stored baseline access policies (not shown) for software application A and user 2 that correspond to resource Z, retrieving any other stored baseline access policies (not shown) that correspond to resource Z (e.g., from user 1), and retrieving any supplemental access policies received in the request 278. In this example, there are no supplemental access policies included with the request, and user 2 may not have any access policy corresponding to resource Z. The access policies of software application A for resource Z authorize the request 278 in this example, since the request is being made by software application A, who is authorized to access the resource. In addition, user 2 does not have any stored access policies that correspond to resource Z, and thus access is not prevented by any such access policies. However, the stored baseline access policy for resource Z that was previously specified by user 1 does not in this example allow access by any other users, unless those users include a supplemental access policy issued by user 1 to authorize such access. Since user 2 has not provided such a supplemental access policy, the stored baseline access policy for user 1 causes the access request to fail, which is indicated graphically by the communication 280 in FIG. 2B ending in an "X" to prevent access to the resource. An access failure response would then be provided to software application A (or to another requester in another embodiment).

Figure 2C:
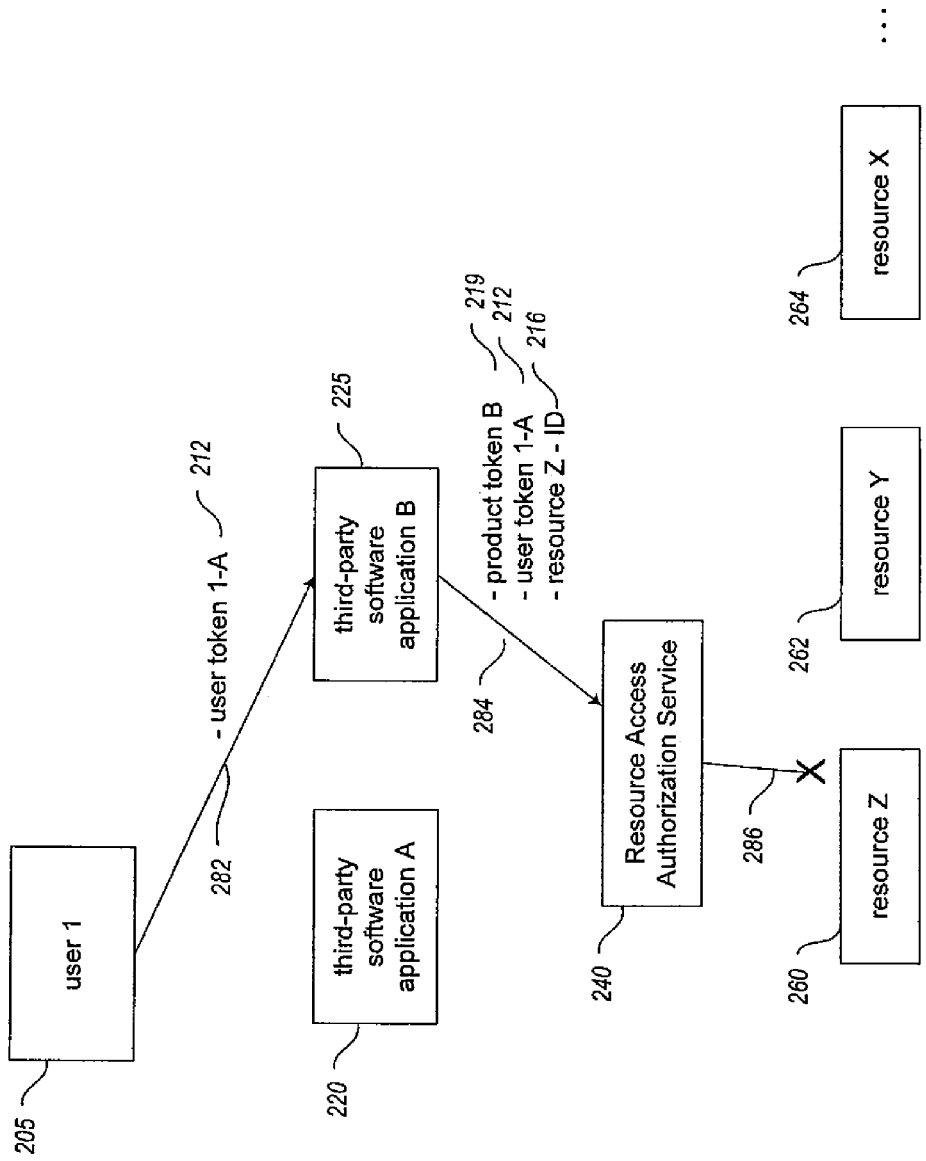

FIG. 2C continues the example of FIGS. 2A and 2B, but in this example user 1 (or alternatively another user who is attempting to impersonate user 1) attempts to obtain unauthorized access to resource Z 260 via a software application B 225 distinct from software application A 220. In particular, in this example, user 1 performs one or more interactions 282 with software application B to provide a user token for user 1 to software application B. Typically, user 1 would subscribe to use of software application B in a manner similar to that for software application A, and obtain a user token corresponding to software application B that is distinct from the user token 212 previously obtained and used by user 1 with software application A. However, in this example, user 1 knows that access to resource Z was initiated via software application A using user token 212, and attempts to use the same user token 212 to obtain the same access to resource Z via software application B. The user 1 may attempt to use software application B instead of software application A for various reasons, such as if software application A is a fee-based software application that meters and charges user 1 for use (e.g., for access to resource Z) while software application B does not, if another user is attempting to impersonate user 1 but does not have sufficient information other than the user token 212 to cause software application A to accept the user as user 1 (e.g., a password, a secret key, etc.), etc.

Thus, in this example, user 1 provides to software application B the same user token 212 that was previously used with software application A. Software application B then initiates a request 284 to the Resource Access Authorization service 240 to obtain access to resource Z on behalf of user 1. The request 284 includes an indication 216 of resource Z, as well as the user token 212 and a product token 219 for software application B. In some embodiments, user tokens are tied to use with particular software applications, such as by including an identifier for that associated software application as part of the user token, or by otherwise being associated with that software application. If so, the service 240 would refuse the access request 284 without even using any access policies specified by software applications A or B or by user 1, since the user token 212 is attempting to be used with software application B, to which it does not correspond.

However, even if such mapping of a user token to a product token is not used, the service 240 will nonetheless determine to refuse the access request 284 in this example based on the access policies previously specified. In particular, the service 240 operates in a manner similar to that previously discussed with respect to FIGS. 2A and 2B, by identifying user 1 from the token 212, identifying software application B from token 219, retrieving any stored baseline access policies (not shown) for user 1 and software application B, retrieving any other stored baseline access policies (not shown) that correspond to resource Z (e.g., for software application A), receiving any supplemental access policy specified with the request 284, and determining whether to authorize access based on those access policies. In this example, there are no such supplemental access policies included with the request, and software application B may not have any access policy corresponding to resource Z. In particular, in this example, the stored baseline access policy for software application A for resource Z indicates that access is available only to software application A unless another software application includes a supplemental access policy from software application A that would authorize such access, and thus the request 284 fails since software application B is not authorized under that access policy to make the request. The user 1 access policy for resource Z would, however, permit access for the request in this example, since user token 212 identifies the request as corresponding to user 1, who is an authorized user in accordance with the user access policy for the resource. Since the access authorization is denied, a response will be sent to software application B to that effect, and the access 286 to resource Z is denied. Thus, in different situations, a given user such as user 1 may have different access rights regarding use of resources initiated on behalf of the user, such as based on different roles of the user (e.g., software applications used, when the user is an end user of a software application versus acting as the developer user who created a different software application, etc.).

Figure 2D:
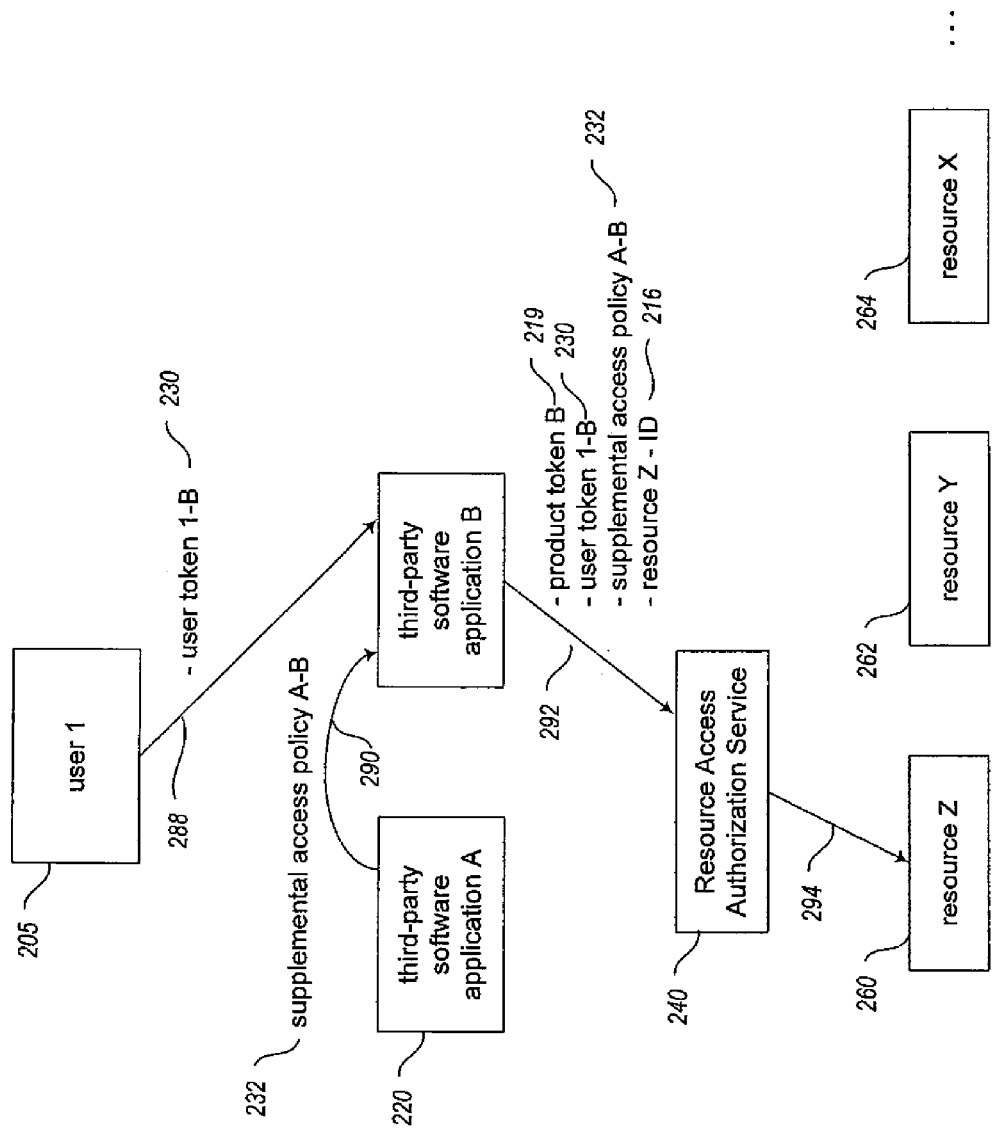

FIG. 2D continues the examples of FIGS. 2A-2C, but in this example user 1 makes an authorized access of resource Z 260 via software application B. In this example, the access request is authorized based on a supplemental access policy provided from software application A to software application B that permits the access. In particular, in this example, user 1 performs one or more interactions 288 with software application B 225 similar to that of FIG. 2C, but in this example a user token 230 that is specific to software application B is provided to software application B. in addition, in this example, software application B has received a supplemental access policy 232 from software application A that provides authorization for software application B to access resource Z. Software application B may receive the supplemental access policy 232 in various ways, as discussed below. The software application B then makes a request 292 to the Resource Access Authorization service 240 for access to resource Z 260 in a manner similar to that previously described. In particular, the request 292 includes an indication 216 of the resource, the user token 230, and the product token 219 for software application B. In addition, in this example the request 292 includes a copy or other indication of the supplemental access policy 232 with the request 292.

When the service 240 receives the request, it operates in a manner similar to that previously discussed with respect to FIGS. 2A-2C, including by identifying user 1 from the token 230, identifying software application B from the token 219, retrieving any stored baseline access policies (not shown) for resource Z for user 1 and software application B, retrieving any other stored baseline access policies (not shown) that correspond to resource Z (e.g., for software application A), and retrieving the supplemental access policy 232 from the request 292. in this example, software application B may not have any access policy corresponding to resource Z. The baseline access policy for user 1 for resource Z authorizes the request in this example, since user 1 is an authorized user. The baseline access policy for software application A for the resource Z would by default cause the access request to be denied, however, since software application B is not a default authorized software application in accordance with that access policy. Nonetheless, that baseline access policy for software application A is satisfied in this situation because it does allow access by other software applications if they have a supplemental access policy that indicates authorization from software application A, and the supplemental access policy 232 satisfies that aspect of the stored baseline access policy for software application A in this example, causing it to authorize access to resource Z. Accordingly, the service 240 performs one or more communications 294 to indicate that the access is authorized, such as by retrieving the resource Z for the software application B. While not illustrated here, in other embodiments software application B could obtain authorized access to resource Z without the supplemental access policy 232, such as if the stored baseline access policy for software application A for resource Z is modified to allow software application B to obtain such access (to obtain read access to the file represented by resource Z). While the example of FIG. 2D includes use of a supplemental access policy to enable another software application to obtain access to a computing-related resource, such supplemental access policies may be used in other examples to provide another user (e.g., user 2) with authorization to access resource Z, such as via a supplemental access policy issued by user 1 and/or software application A.

In addition, as previously noted, in this example the access request 292 is authorized based in part on a supplemental access policy 232 that software application B receives from software application A. Such a supplemental access policy may be specified in various manners in various embodiments. For example, in some situations, software application B could receive and encode such a supplemental access policy at the time of creation of software application B, such as based on a relationship between the developers of software applications A and B (e.g., being different software applications from the same developer, being different software applications from different developers who have an affiliation relationship, etc.). If so, the developer for software application A could create and provide a supplemental access policy to the software application B developer for inclusion with the software application B. In other embodiments and situations, the copy of software application B used by user 1 may be able to dynamically obtain supplemental access policy 232 from software application A while the software application B copy is executing. For example, software application A may include an API that allows other software applications to make requests to software application A for a supplemental access policy, and if so the software application B copy may dynamically make such a request to an executing copy of software application A (e.g., to the executing copy of software application A of user 1 that initiated the use of the resource Z on behalf of user 1), and receive a communication 290 from that software application A copy that includes the supplemental access policy 232. Alternatively, in some embodiments, the Resource Access Authorization service 240 or other service of the Multi-Party Resource Access Manager system may instead provide functionality to receive such requests for such supplemental access policies and to provide them if appropriate (e.g., based on previously specified information for the software application being asked to issue the supplemental access policy, based on dynamically interacting with an executing copy of the software application being asked to issue the supplemental access policy in order to request that the supplemental access policy be provided, etc.). In yet other embodiments and situations, the supplemental access policy 232 may be issued based at least in part on approval by user 1. For example, when subscribing to software application A via interactions with the Multi-Party Resource Access Manager system and/or when using software application A, user 1 may be prompted to provide information about other software applications that should be authorized to access resources of one or more types that are used by software application A on behalf of user 1 (e.g., based on a request from software application B). If user 1 specifies software application B in such a situation, that authorization may prompt software application A to issue and provide the supplemental access policy 232 to software application B. Alternatively, a supplemental access policy based on the user approval could instead be included with the user token for software application A and/or software application B, so as to be provided to software application A or B, respectively, via those user tokens. If the user authorizes such a supplemental access policy for software application B after the initial user token 230 for software application B is issued, the Multi-Party Resource Access Manager system may further be prompted to issue a new user token for user 1 and software application B that includes information about the supplemental access policy, such as during a next access request to a component of the Multi-Party Resource Access Manager system and/or at another time.

Figure 3:
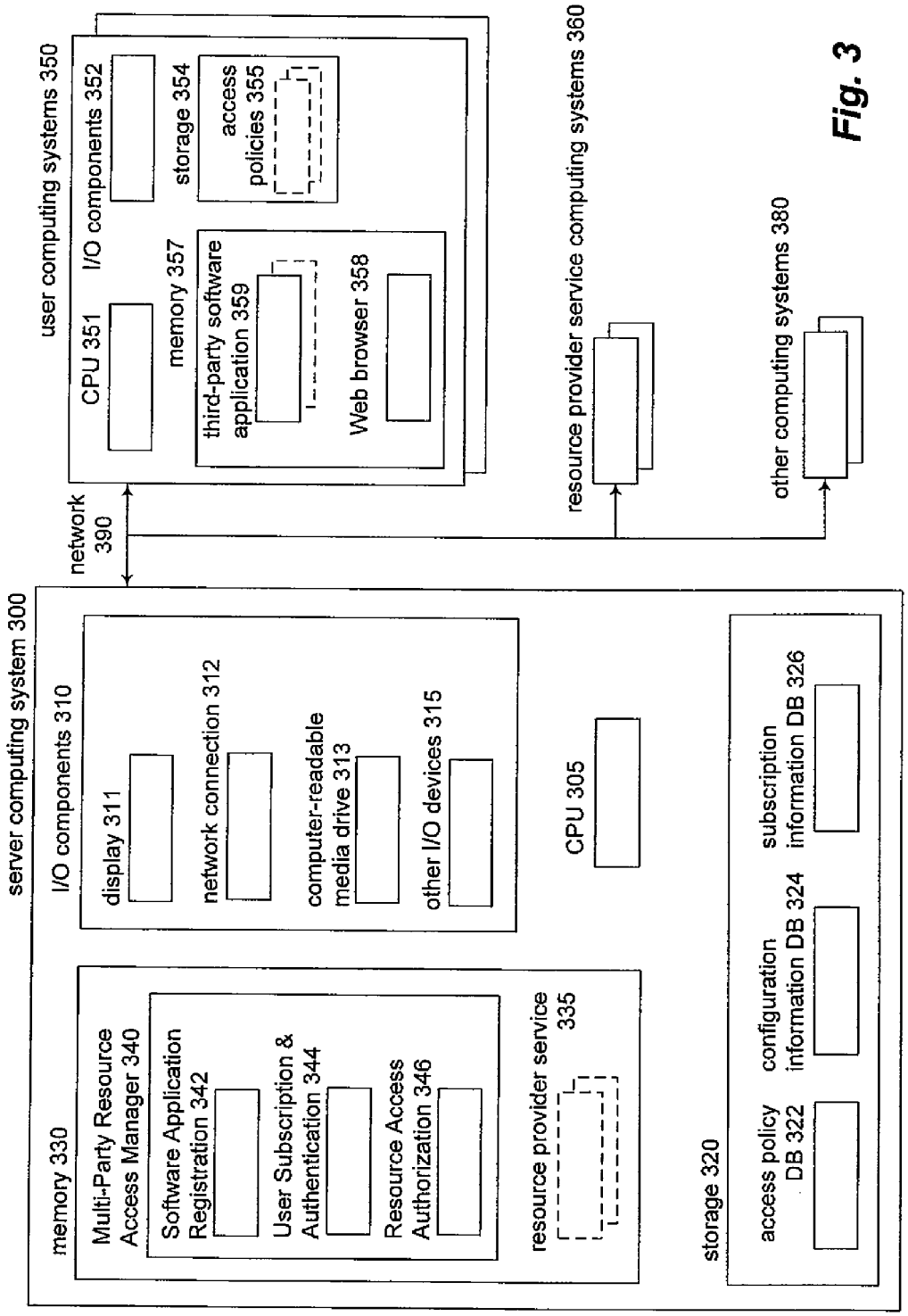
FIG. 3 is a block diagram illustrating an example embodiment of a computing system for facilitating control of access to computing-related resources based on instructions from multiple distinct parties.

FIG. 3 is a block diagram illustrating an example computing system suitable for performing techniques for facilitating control of access to computing-related resources based on instructions from multiple distinct parties. In particular, FIG. 3 illustrates a server computing system 300 suitable for executing an embodiment of a Multi-Party Resource Access Manager system 340, as well as various user computing systems 350, resource provider service computing systems 360, and other computing systems 380. In the illustrated embodiment, the server computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, speakers, etc.). While not illustrated here, each of the computing systems 360 and 380 may include components similar to those illustrated with respect to computing systems 300 and 350.

In this illustrated embodiment, a software Multi-Party Resource Access Manager system 340 is executing in memory 330, and it interacts with the computing systems 350, 360 and 380 over a network 390 using the network connection 312 (e.g., via the Internet and/or the World Wide Web, cellular network, etc.). In this example embodiment, the system 340 includes several components to each provide functionality related to facilitating control of access to computing-related resources based on instructions from multiple distinct parties, including a Software Application Registration component 342, a User Subscription And Authentication component 344, and a Resource Access Authorization component 346.

In particular, various resource provider services may be available that each makes resources of one or more types available to executing software applications, such as on a fee basis. For example, each of the resource provider service computing systems 360 may provide one or more such resource provider services, such as by making available computing-related resources (not shown) of one or more of the computing systems 360 and/or 380. In addition, in some embodiments, the server computing system 300 may optionally provide one or more such resource provider services 335 executing in memory 330 (e.g., if the system 340 is provided by the same provider as those services 335 and/or is configured to specifically support those services 335), such as instead of or in addition to any other resource provider services from the computing systems 360. Furthermore, to facilitate use of the resource provider services by software applications, the resource provider services each provide information in the illustrated embodiment to the system 340 regarding the use of the resource provider services (e.g., fees for use of the resource provider service, such as an indicated fee for an indicated amount of use with respect to one or more indicated use dimensions; terms and conditions; etc.), which may be stored in a configuration information database ("DB") data structure 324 on storage 320.

In addition, various software application provider users (not shown) may each create or otherwise provide one or more software applications for use by end users, and may each configure their software applications to use resources of one or more of the resource provider services on behalf of end users of the software applications. In particular, a software application creator or other provider user may interact with the Software Application Registration component 342 to configure a software application's use of one or more resource provider services, such as to specify fees to be charged an end user for use of computing-related resources of a resource provider service by the software application on behalf of the end user (e.g., fees that may be based on the fees charged by the resource provider service for such resource use), specify application-specific terms and conditions, etc. Such configuration information may then be stored in a configuration information database data structure 324 on storage 320. In the illustrated embodiment, end users may pay ongoing subscription fees to use the software applications based on the configured fees, such as subscription fees that vary with amount and type of use of the software applications (e.g., based at least in part on use by the software applications of computing-related resources of the resource provider services on behalf of the end users), although in other embodiments some or all of the software applications may not have such subscription fees (e.g., may be free, may have one-time purchase or other fees, may only charge fees to end users that are passed through from underlying resource provider services whose resources are used by the software application on behalf of the end users, etc.). The software application provider user may additionally specify one or more access policies (e.g., a single access policy for all resource provider services, a distinct access policy for each such resource provider service being used, etc.), such as a baseline access policy that is stored in the access policy database data structure 322 on storage 320 for later use. In other embodiments, the access policy information may be stored in other manners, such as for at least some access policies (e.g., supplemental access policies to be included with resource access requests made by the executing software application on behalf of an end user) to be stored locally as an access policy 355 on storage 354 of a computing system 350 of an end user who is using a copy of the software application. Each software application provider user may then provide copies of their software applications (not shown) to end users in various ways, such as by using one or more of the computing systems 380. For example, each computing system 380 may provide information about one or more available software applications to end users (e.g., via a Web site provided by the computing system 380), and/or may allow end users to download or otherwise obtain copies of the software applications.

Users of the computing systems 350 may then each obtain copies of one or more software applications (e.g., via download from a computing system 380, such as by using a Web browser 358 executing in memory 357 to interact with the computing system 380; via purchase or other acquisition of a CD or other computer-readable medium that stores the software application, etc.), load those copies on the computing systems 350, and subsequently execute those copies as software applications 359 in memory 357 of the computing system 350. In the illustrated embodiment, before using a software application (or as part of the first use of the software application), the end users may interact with the User Subscription And Authentication component 344 to provide various subscription information related to use of the software application, such as payment information for payment of subscription fees for the software application. Such subscription information may then be stored in a subscription information database data structure 326 on storage 320. In addition, an end user may additionally specify one or more access policies, such as a single access policy for all computing-related resources used by the software application on behalf of the end user, a distinct access policy for each resource provider service that the software application is configured to use, etc., with some or all of the access policy information being stored in the access policy database data structure 322 on storage 320. In other embodiments, the access policy information may be stored in other manners, such as to store the access policies of end users separately from the access policies for software applications, and/or for at least some end user access policies (e.g., supplemental access policies to be included with resource access requests made by an executing software application on behalf of an end user) to be stored locally as an access policy 355 on storage 354 of a computing system 350 of the end user. While not illustrated here, in other embodiments, one or more software application provider users may provide one or more network-accessible software applications that multiple remote end users may interact with over the network 390, whether instead of or in addition to providing software applications that will execute locally on the computing systems 350 of the end users.

When an executing software application copy 359 is executing in memory 357 of a user computing system 350 on behalf of a user of the computing system, the software application copy may then make requests for access to computing-related resources of resource provider services. Such access requests are then sent to the Resource Access Authorization component 346, whether directly by the executing software application copy, or indirectly by a resource provider service after the software application copy makes the access request to the resource provider service. As previously noted, in some embodiments, an access request may include one or more supplemental access policies for the end user and/or software application. The component 346 obtains any access policies for the end user and software application that are relevant to the access request (e.g., stored baselines access policies and/or supplemental access policies supplied with the access request), determines whether to authorize the access request in accordance with those access policies, and provides an indication of whether the access is authorized (e.g., to the underlying resource provider service that provides the resource whose access is being requested). While not illustrated here, in other embodiments, the component 346 may directly provide access for software applications to at least some resources whose access is determined to be authorized, such as by directly interacting with those resource provider services (e.g., resource provider services 335) on behalf of the software application.

It should be appreciated that computing systems 300, 350, 360 and 380 are merely illustrative and are not intended to limit the scope of the present disclosure. For example, computing system 300 and the executing system 340 may instead be comprised of multiple interacting computing systems or devices, and may be connected to other devices that are not illustrated, including through one or more networks such as the Internet, via the World Wide Web ("Web"), or other electronic communications network (e.g., cellular based network, public switched telephone network). More generally, a "client" or "server" computing system or device may comprise any combination of hardware or software that may interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), game consoles, media players, and various other consumer products that include appropriate inter-communication and computing capabilities. In addition, the functionality provided by the illustrated system components may in some embodiments be combined in fewer components or distributed in additional components. Similarly, in some embodiments, the functionality of some of the illustrated components may not be provided and/or other additional functionality may be available.

It should also be appreciated that, while various elements are illustrated as being stored in memory or on storage while being used, these elements or portions of them may be transferred between memory and other storage devices, such as for purposes of memory management and data integrity, and that these elements or portions of them may in other embodiments be stored in other memory and/or other storage devices, including ones not shown in this example embodiment. Alternatively, in other embodiments some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored as contents (e.g., as executable or other machine-readable software instructions or structured data) of a computer-readable medium (e.g., as a hard disk; a memory; a computer network or cellular wireless network or other data transmission medium; or a portable media article to be read by an appropriate drive or via an appropriate connection, such as a DVD or flash memory device), so as to enable or configure the computer-readable medium and/or one or more associated computing systems or devices to execute or otherwise use or provide the contents to perform at least some of the described techniques. Some or all of the system components and data structures may also be transmitted as contents of generated data signals (e.g., by being encoded in a carrier wave or otherwise included as part of an analog or digital propagated signal) on a variety of computer-readable transmission mediums, including wireless-based and wired/cable-based mediums, may take a variety of forms (e.g., as part of a single or multiplexed analog signal, or as multiple discrete digital packets or frames), and may similarly enable or configure the computer-readable transmission medium and/or one or more associated computing systems or devices to execute or otherwise use or provide the contents to perform at least some of the described techniques. Such computer program products may also take other forms in other embodiments. Accordingly, the inventive techniques may be practiced with other computer system configurations.

Figure 4:
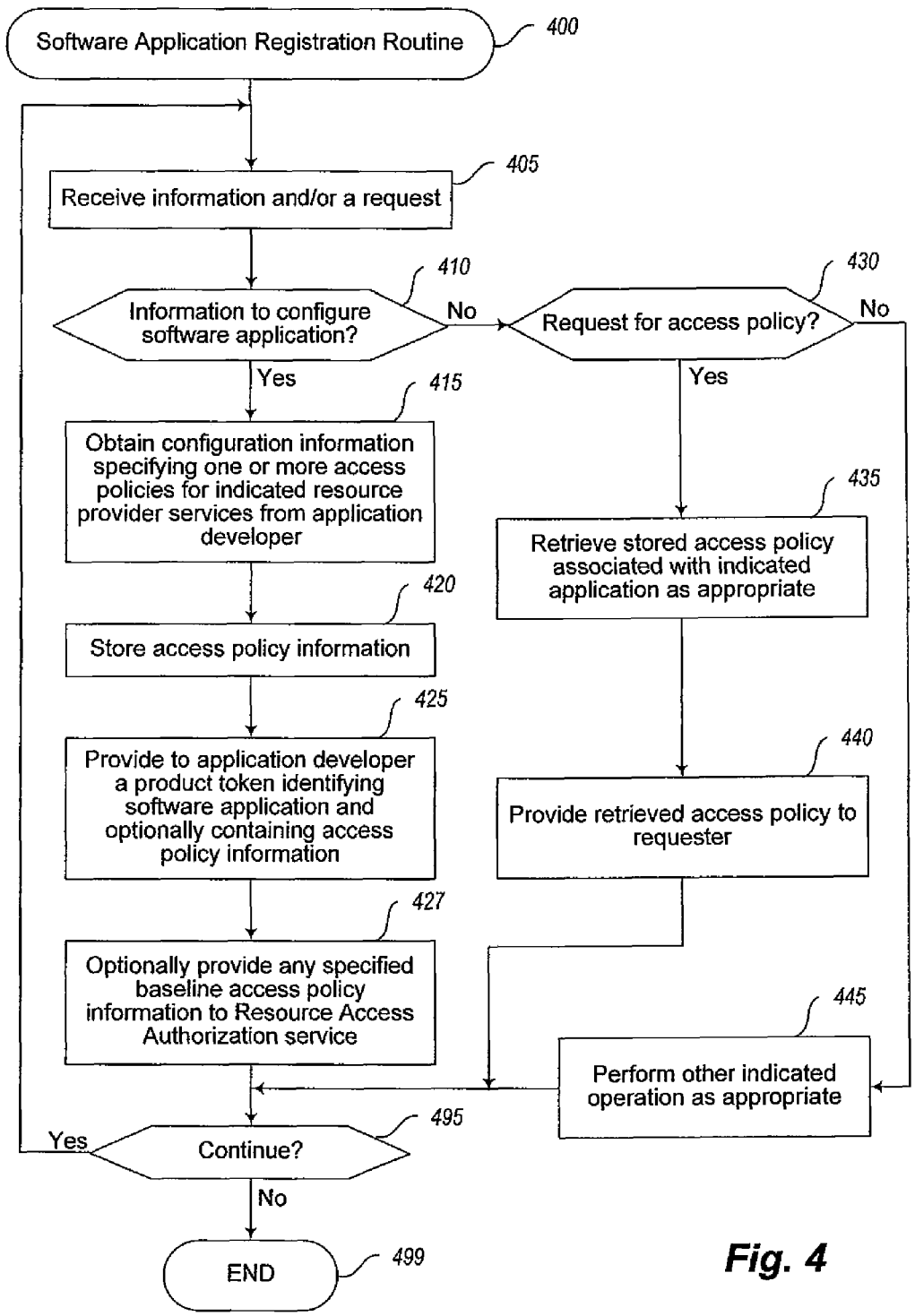
FIG. 4 is a flow diagram of an example embodiment of a Software Application Registration routine.

FIG. 4 is a flow diagram of an example embodiment of a Software Application Registration routine 400. The routine may be provided by, for example, execution of the Software Application Registration component 342 of FIG. 3 and/or by execution of the Software Application Registration service 112 of FIG. 1, such as to allow developers or other providers of software applications to configure later use by the software application of functionality provided by one or more resource provider services, including to configure baseline access policies or other access policies for resources used by the software application via those resource provider services.

The routine begins at block 405, where information and/or a request is received. The routine continues to block 410 to determine whether information is received from a software application developer user or other provider of a software application for use in configuring later use of resource provider services by executing copies of the software application. If so, the routine continues to block 415 to obtain configuration information related to one or more such resource provider services. While not illustrated here, in some embodiments, the routine may further provide information to the developer user or other provider to indicate available resource provider services, as well as various information specific to those resource services (e.g., prices charged by the resource provider services for use of their resources that they provide, terms and conditions for use in the resource provider service, etc.). The configuration information obtained in block 415 may include various types of information regarding the use of resources of a resource provider service by executing copies of the software application, including one or more access policies to control use of such resources that are created or otherwise initiated by executing copies of the software application. As one specific example, a software application developer user may specify that software applications other than the current software application are not authorized to use the software application's resources unless those other software applications receive and provide evidence of authorization for such access, such as a supplemental access policy provided by the current software application. In addition, in embodiments in which resource provider services charge various fees for use of resources, the obtained configuration may further include information regarding such fees, such as to allow the software application developer user to configure fees to be charged end users of the software application (e.g., for use of resources via the resource provider services on behalf of end users), whether the same or different fees that are charged by the underlying resource provider service, and whether or not for the same types of activities.

After block 415, the routine continues to block 420 to store the access policy information and other obtained configuration information. In block 425, the routine then provides a product token to the software application developer user or other provider for use with the software application. As described in greater detail elsewhere, such a product token may include a unique identifier for the software application, which may further be associated with the stored access policy information and other configuration information to enable later retrieval and use of that information, such as when a request is received from an executing copy of the software application related to use of resources via a resource provider service. Furthermore, in some embodiments, the product token may be configured to include additional information, such as some or all of the access policy information for the software application and/or other configuration information for the software application. In the illustrated embodiment, the routine in block 425 generates the product token to be provided, although in other embodiments a product token (or other identifier) may be generated in other manners, such as being received from the software application developer user, being retrieved from a previous association with the software application and/or software application developer user, etc. In block 427, the routine then proceeds to, in some embodiments, provide any specified baseline access policy information for the software application to a Resource Access Authorization service for later use in controlling access to resources by or on behalf of the software application, although in other embodiments such access policy information may be made available to the Resource Access Authorization service in other manners (e.g., may be passed to that service as part of a request by an executing copy of the software application, such as via a product token or in another manner; may be retrieved by that service, such as periodically; etc.).

If it was instead determined in block 410 that information was not received in block 405 to configure a software application, the routine continues instead to block 430 to determine whether a request is received for access policy information for one or more software applications. Such a request may be received from, for example, the Resource Access Authorization service, such as if it periodically retrieves such information, or instead dynamically retrieves such information when needed (e.g., when a request is received from an executing copy of the software application). In some embodiments, the received request may include a product token or other unique identifier for each of one or more software applications for which stored access policy information is desired, while in other situations the request may be for any stored access policy information that meets specified criteria (e.g., created since a previous time at which access policy information was last retrieved). If so, the routine continues to block 435 to retrieve the stored access policy information that was requested, and in block 440 provides the retrieved access policy information to the requester. While not illustrated here, in other embodiments, a determination may be made as to whether the requester has authorization to access the requested information, and may provide the requested information only if such authorization is present.

If it was instead determined in a block 430 that a request for access policy information was not received, the routine continues instead to block 445 to perform one or more other indicated operations as appropriate, such as for a software application developer user to modify configuration information for a software application, including to modify a baseline access policy for that software application and indicate a resource provider resource; such as to receive and respond to requests from software application developers and/or executing copies of software applications to issue a supplemental access policy to provide an indicated other software application (or other executing copy of another software application) with access to one or more resources from one or more resource provider services that are controlled by the software application; etc. After blocks 427, 440, or 445, the routine continues to block 495 to determine whether to continue. If so, the routine returns to block 405, and if not continues to block 499 and ends.

Figure 5:
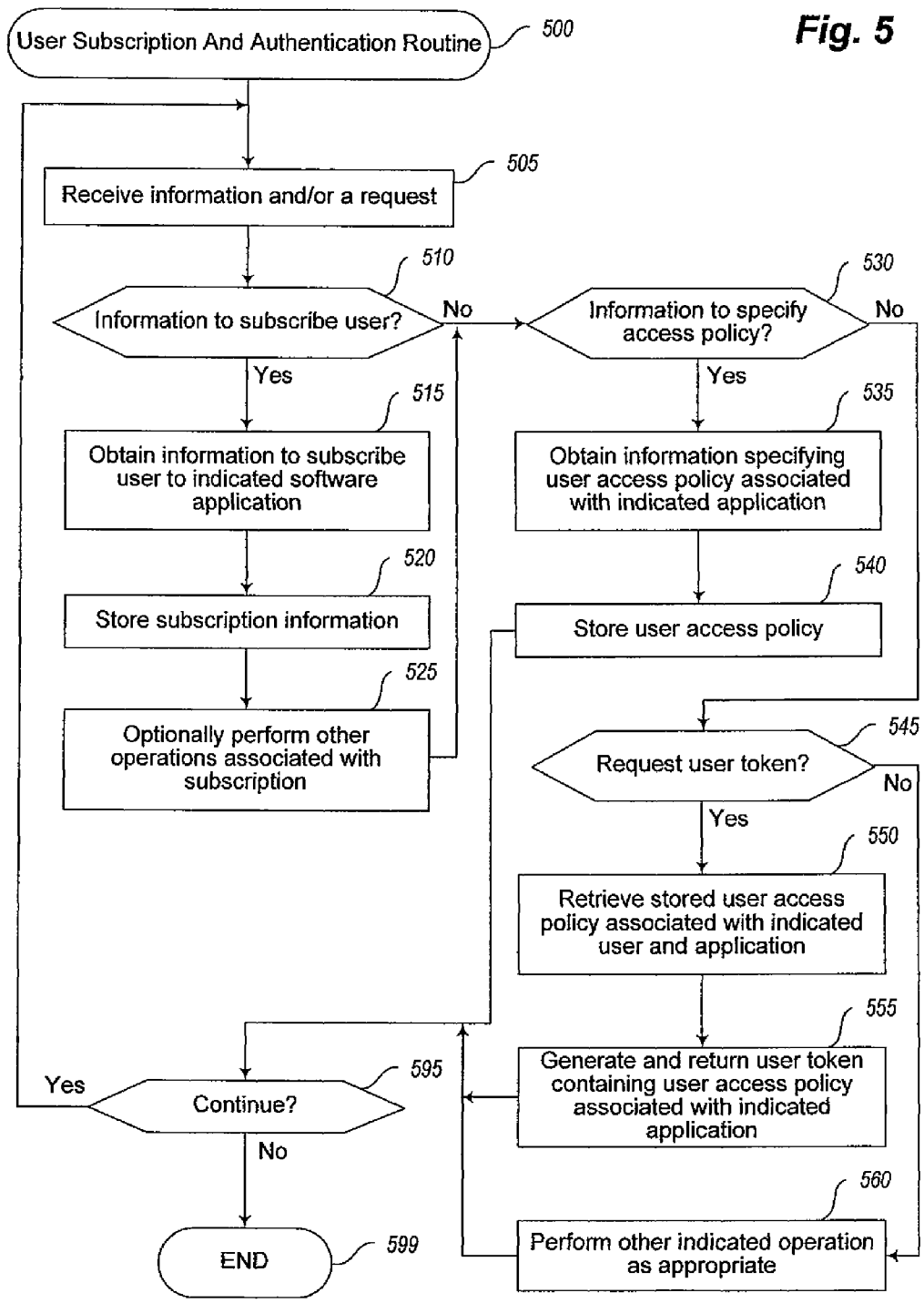
FIG. 5 is a flow diagram of an example embodiment of a User Subscription And Authentication routine.

FIG. 5 is a flow diagram of an example embodiment of a User Subscription And Authentication routine 500. The routine may be provided by, for example, execution of the User Subscription And Authentication component 344 of FIG. 3 and/or the User Subscription And Authentication service 114 of FIG. 1, such as to obtain information from users regarding use of software applications, including access policies specified by the user for resources used by those software applications via other resource provider services on behalf of the users.

The routine begins in block 505, where information and/or a request is received. The routine continues to block 510 to determine whether information is received from a user to subscribe to use of a software application. If so, the routine continues to block 515 to obtain subscription information from the user for an indicated software application. While not illustrated here, the user may in some embodiments be provided with information about possible software applications to subscribe to, and may receive various types of information about one or more such software applications, including fees charged by the software application (e.g., fees that corresponds to use of resources on behalf of the user via one or more resource provider services). Various types of information may be obtained from the user when subscribing to the software application, including an agreement to terms and conditions for the software application, financial payment information to be used to pay fees charged by the software application, etc. In addition, in some embodiments the user may specify one or more access policies to control use of resources by the software application via resource provider services on behalf of the user, as discussed in greater detail with respect to block 535. The routine then continues to block 520 to store the subscription information, and in block 525 optionally performs one or more other operations associated with the subscription, such as charging the user for initial access fees for the software application, providing the user with a user activation key for the subscription (e.g., to be provided to an executing copy of the software application at a later time, such as when the user first begins use of the software application copy) for use in verifying that the user has a valid subscription, etc. After block 525, or if was instead determined in block 510 that subscription information was not received, the routine continues to block 530 to determine whether information is received to specify an access policy for the user for an indicated software application or resource provider service.

If so, the routine continues to block 535 to obtain information specifying one or more such access policies, and in block 540 stores the user access policy information. As one specific example, the user may indicate that no other users may be allowed access to such resources used on behalf of the user unless the user provides those other users with an indication of authorization, such as a supplemental access policy to allow those other users to obtain access to one or more indicated resources from one or more resource provider services. As discussed in greater detail with respect to block 555, the routine may further generate a user token that encodes some or all of the specified access policy information.

If it was instead determined in block 530 that information was not received to specify an access policy, the routine continues instead to block 545 to determine whether a request was received from a software application for a user token for an end user. For example, after a copy of a software application begins to execute, it may prompt the user to provide an activation key to indicate that the user has a valid subscription to use the software application. After receiving such an activation key, the executing copy of the software application may contact the current routine to validate the activation key and receive a corresponding user token that includes various information about the user's subscription, such as to encode information about an access policy specified by the user that corresponds to use of resources by the software application. In particular, if a request for such a user token was received in block 545, and if generation of such a user token is authorized (e.g., a received activation key is valid), the routine continues to block 550 to retrieve stored user access policy information associated with the indicated user and application, and in block 555 generates and returns a user token that encodes that user access policy information. As discussed in greater detail elsewhere, when the software application later makes a call to access a resource on behalf of an end user, the software application may provide both that software application's product token and a user token for the end user, so that the Resource Access Authorization service may identify the relevant access policy information corresponding to the request and determine whether to authorize the access.

If it was instead determined in block 545 that the received information was not a request for a user token, the routine continues instead to block 560 to perform one or more other indicated operations as appropriate. For example, a user may make a request to modify an existing subscription, such as to cancel the subscription or to change one or more access policies associated with the subscription. In addition, in some situations, the user may make a request for a supplemental access policy to be generated to allow another user to have a specified type of access to one or more resources used on behalf of the user by one or more software applications at one or more resource provider services. After blocks 540, 555, or 560, the routine continues to block 595 to determine whether to continue. If so, the routine returns to block 505, and if not the routine continues to block 599 and ends.

Figure 6:
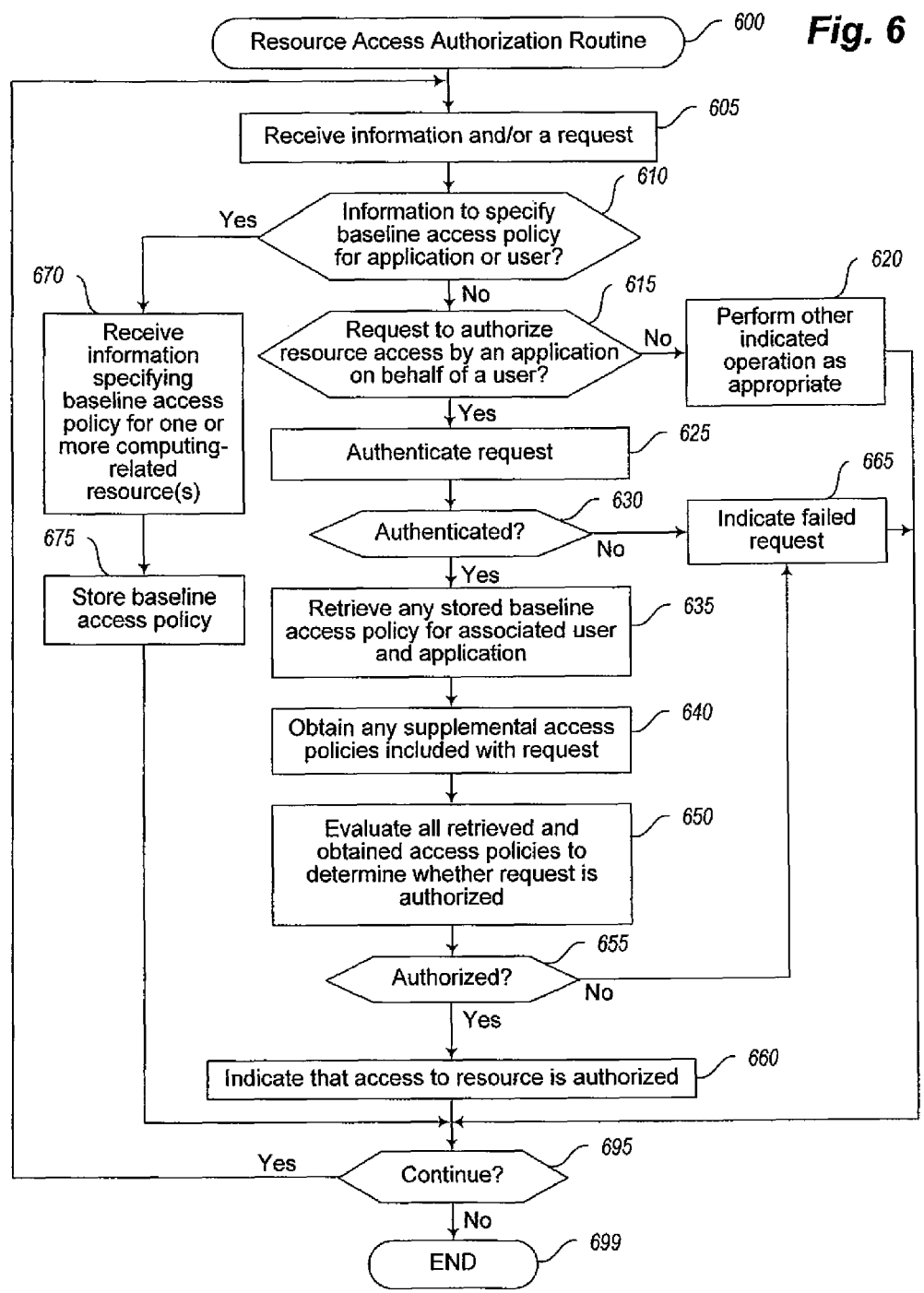
FIG. 6 is a flow diagram of an example embodiment of a Resource Access Authorization routine.

FIG. 6 is a flow diagram of an example embodiment of a Resource Access Authorization routine 600. The routine may be provided by, for example, execution of the Resource Access Authorization component 346 of FIG. 3, the Resource Access Authorization service 240 of FIGS. 2A-2D, and/or the Resource Access Authorization service 116 of FIG. 1, such as to receive requests from software applications for access to resources from resource provider services on behalf of end users of the software applications, and to determine whether to authorize access based on a combination of multiple access policies for the application and end user.

The routine begins at block 605, where information and/or a request is received. The routine continues to block 610 to determine whether information was received to specify a baseline access policy for an application or a user, and if so continues to block 670 to receive information specifying a baseline access policy for one or more computing-related resources. In block 675, the routine then stores the baseline access policy information. For example, in some situations when a request is made to initiate use of one or more resources, the request may include a baseline access policy for use in controlling later access to those resources and/or to any resources provided by the same resource provider service (e.g., if these resources are the first being used by the software application for this resource provider service). Furthermore, while not illustrated here, in some embodiments the routine may further authenticate any such received request before storing or otherwise accepting the indicated baseline access policies, as discussed with respect to block 625.

If it was instead determined in block 610 that information was not received to specify a baseline access policy, the routine continues instead to block 615 to determine whether a request was received to authorize access to one or more computing-related resources by a software application on behalf of a user. If so, the routine continues to block 625 to optionally authenticate the request, such as by determining if the request includes a credential or other information that indicates the request is from the software application (e.g., if at least some of the request is encrypted using a key provided to the software application and/or user by the Multi-Party Resource Access Manager system). In block 630, if it determined that the request is not authenticated, the routine continues to 665 to indicate that the request failed, but otherwise continues to block 635 to retrieve any stored baseline access policy for the user and software application corresponding to the request. In block 640, the routine then obtains any supplemental access policy associated with the request, such as any access policies passed along with the request (e.g., as encoded in a user token and/or product token included with the request). In block 650, the routine then evaluates all of the retrieved and obtained access policies to determine whether to authorize the request, such as only if all of the access policies are satisfied. In other embodiments, access policies may control access to resources in other manners, such as if a majority of the access policies authorize access, or using other voting mechanisms (e.g., with weighting provided so that votes from some parties may count more than votes from other parties). If it is determined in block 655 that the request is not authorized, the routine returns to block 665, but otherwise continues to block 660 to indicate that access to the resource(s) is authorized. In some embodiments, the routine may further provide access to the resource(s), while in other embodiments may provide an indication to the resource provider service that the access is authorized.

If it was instead determined in block 615 that the received request was not to authorize access to a resource, the routine continues instead to block 620 to perform one or more other indicated operations as appropriate. For example, in some embodiments users and/or applications may request that supplemental access policies be issued or authorized to enable other users and/or software applications to obtain access to indicated resources. After blocks 620, 660, 665, or 675, the routine continues to block 695 to determine whether to continue. If so, the routine returns to block 605, and if not continues to block 699 and ends.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners. The data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having stored contents including instructions that, when executed, configure a computing device to:
   receive indications of multiple access policies for use in obtaining access, by a software application on behalf of an end user, to one or more computing-related resources that are provided by an entity distinct from the end user and from a provider of the software application, the multiple access policies including a first access policy specified by the end user and a second access policy that is independently specified for the software application by one or more entities separate from the end user, wherein the first access policy includes one or more constraints to restrict access to the one or more computing-related resources to access that is on behalf of the end user, and wherein the second access policy includes one or more additional constraints to restrict access to the one or more computing-related resources to access that is by the software application;
   determine, by the configured computing device, to authorize the access to the one or more computing-related resources based at least in part on the access satisfying the multiple access policies; and
   provide an indication that the access to the one or more computing-related resources is authorized, to enable the access to the one or more computing-related resources.

2. The non-transitory computer-readable medium of claim 1 wherein the stored contents further configure the computing device to receive, after the receiving of the indications of multiple access policies and via one or more electronic communications sent over one or more computer networks from a client device of an end user, a request from the end user for the access to the one or more computing-related resources, wherein the determining is performed in response to the request, and wherein the providing of the indication that the access to the one or more computing-related resources is authorized includes sending one or more additional electronic communications over the one or more computer networks from the configured computing device to a network-accessible resource provider service that is the entity providing the one or more computing-related resources, to cause a use of the one or more computing-related resources that is on behalf of the end user and that is for the software application and that is controlled by the network-accessible resource provider service.

3. The non-transitory computer-readable medium of claim 2 wherein the second access policy is specified, at a time before the request is received, by an application developer who created the software application.

4. The non-transitory computer-readable medium of claim 1 wherein the configured computing device is executing the software application, and wherein the providing of the indication that the access to the one or more computing-related resources is authorized includes accessing, by the configured computing device and for the executing software application, the one or more computing-related resources.

5. The non-transitory computer-readable medium of claim 1 wherein the software application is executing on the client device of the end user, and wherein the request is sent to the configured computing device from the executing software application, to enable the executing software application to access the one or more computing-related resources.

6. The non-transitory computer-readable medium of claim 5 wherein the configured computing device is part of a resource access manager system that provides authorization services for the one or more computing-related resources, and wherein the client device of the end user is a mobile device.

7. The non-transitory computer-readable medium of claim 5 wherein the configured computing device is part of a network-accessible resource provider service that is the entity providing the one or more computing-related resources, and wherein the providing of the indication that the access to the one or more computing-related resources is authorized includes providing, by the network-accessible resource provider service, the executing software application with access to the one or more computing-related resources.

8. The non-transitory computer-readable medium of claim 1 wherein the second access policy is specified, at a time before executing of the software application for the end user, by a distributor of the software application.

9. The non-transitory computer-readable medium of claim 1 wherein the multiple access policies include an access policy specified by a second software application used by the end user.

10. The non-transitory computer-readable medium of claim 1 wherein the multiple access policies include an access policy specified by a second user distinct from the end user.

11. The non-transitory computer-readable medium of claim 1 wherein the one or more computing-related resources include a virtual machine image provided by a second user distinct from the end user, and wherein the providing of the indication that the access to the one or more computing-related resources is authorized includes executing the virtual machine image on behalf of the end user.

12. The non-transitory computer-readable medium of claim 1 wherein the one or more computing-related resources include program execution capabilities for use in executing the software application for the end user, wherein the computing device is part of an online service that provides program execution capabilities, and wherein the providing of the indication that the access to the one or more computing-related resources is authorized includes executing the software application by the online service using one or more computing systems provided by the online service.

13. A computing device comprising:
   one or more processors; and
   one or more memories storing instructions that, when executed by at least one of the one or more processors, configure the computing device to:
      receive, via one or more electronic communications sent over one or more computer networks from a client device of an end user, a request from the end user to obtain access, on behalf of the end user and based on multiple access policies defined before the request, to one or more computing-related resources that include a software application provided by one or more entities separate from the end user, the multiple access policies including a first access policy specified by the end user and a second access policy that is independently specified for the software application by the one or more entities, wherein the first access policy includes one or more constraints to restrict access to at least some of the one or more computing-related resources to access that is on behalf of the end user, and wherein the second access policy includes one or more additional constraints to restrict access to at least some of the one or more computing-related resources to access that is authorized for the software application;
      determine to authorize the access to the one or more computing-related resources based at least in part on the access satisfying the multiple access policies; and
      in response to the determining to authorize the access, initiate a use of the one or more computing-related resources that is on behalf of the end user and that is authorized for the software application.

14. The computing device of claim 13 wherein the stored instructions further configure the computing device to perform the use by executing the software application on behalf of the end user after the access is authorized, the software application including a virtual machine image.

15. The computing device of claim 14 wherein the one or more computing-related resources further include program execution capabilities for use in executing the software application for the end user, wherein the computing device is part of an online service that provides program execution capabilities, and wherein the executing of the software application is performed by the online service using one or more virtual machines hosted on physical computing systems provided by the online service.

16. The computing device of claim 13 wherein the computing device is part of a resource access manager system that provides authorization services for the one or more computing-related resources, and wherein the client device of the end user is a mobile device.

17. The computing device of claim 13 wherein the computing device is part of a network-accessible resource provider service that provides the one or more computing-related resources, and wherein the client device of the end user is a mobile device.

18. The computing device of claim 13 wherein the multiple access policies include an access policy specified by one or more additional other entities or an access policy specified for a second software application used by the end user.

19. A computer-implemented method comprising:
   receiving, by a configured computing device of a resource access manager system that provides authorization services for multiple computing-related resources, and via one or more electronic communications sent over one or more computer networks from a client device of an end user of a software application, a request to obtain access, on behalf of the end user and based on multiple access policies defined before the request, for the software application to one or more computing-related resources of the multiple computing-related resources, wherein the multiple access policies include a first access policy specified by the end user and a second access policy that is independently specified for the software application by one or more entities separate from the end user, wherein the first access policy includes one or more constraints to restrict access to the one or more computing-related resources to access that is on behalf of the end user, wherein the second access policy includes one or more additional constraints to restrict access to the one or more computing-related resources to access that is for the software application, and wherein the one or more computing-related resources are provided by a resource-providing entity separate from the end user and from the one or more entities;
   determining, by the configured computing device in response to the request, to authorize the access to the one or more computing-related resources based at least in part on the access satisfying the multiple access policies; and
   in response to the determining to authorize the access, initiate a use of the one or more computing-related resources that is on behalf of the end user and that is for the software application.

20. The computer-implemented method of claim 19 further comprising executing, by the configured computing device at a time after the access is authorized, the software application.

21. The computer-implemented method of claim 19 wherein the software application is executing on the client device of the end user, and wherein the request is sent to the configured computing device from the executing software application, to enable access to the one or more computing-related resources from the executing software application.

22. The computer-implemented method of claim 19 wherein the resource access manager system is part of a network-accessible resource provider service that provides the one or more computing-related resources.

23. The computer-implemented method of claim 19 wherein the software application is part of a virtual machine image and is provided by a second user distinct from the end user, wherein the second access policy is specified by the second user, and wherein the access to the one or more computing-related resources enables executing the virtual machine image on behalf of the end user.

* * * * *